United States Patent
Humburg

(10) Patent No.: US 6,712,283 B2
(45) Date of Patent: Mar. 30, 2004

(54) HEATING APPARATUS AND HOUSING FOR A HEATING APPARATUS

(75) Inventor: Michael Humburg, Esslingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 10/338,505

(22) Filed: Jan. 8, 2003

(65) Prior Publication Data
US 2003/0132304 A1 Jul. 17, 2003

(30) Foreign Application Priority Data
Jan. 12, 2002 (DE) .......................... 102 00 962

(51) Int. Cl.[7] .................................. B60H 1/02
(52) U.S. Cl. .................... 237/12.3 C; 237/2 A; 165/41; 165/42
(58) Field of Search .................. 237/12.3 C, 12.3 R, 237/12.3 B, 2 A; 165/41, 42

(56) References Cited

U.S. PATENT DOCUMENTS

| 4,518,032 A | * | 5/1985 | Funasaki et al. ............ 165/202 |
| 4,773,588 A | * | 9/1988 | Okada .......................... 237/2 A |
| 4,832,258 A | * | 5/1989 | Hoshino et al. .............. 236/13 |
| 4,858,825 A | * | 8/1989 | Kawamura .................. 237/2 A |
| 4,923,033 A | | 5/1990 | Panick et al. |
| 5,253,806 A | * | 10/1993 | Gaysert et al. ......... 237/12.3 C |
| 5,277,365 A | * | 1/1994 | Schattenberg et al. . 237/12.3 C |
| 5,564,627 A | * | 10/1996 | Veitenhansl ............ 237/12.3 B |
| 5,722,588 A | * | 3/1998 | Inoue et al. ........... 237/12.3 C |
| 5,810,078 A | * | 9/1998 | Knutsson et al. ........... 165/203 |
| 6,302,683 B1 | * | 10/2001 | Vestin et al. .................... 431/7 |

FOREIGN PATENT DOCUMENTS

| DE | 43 27 139 | 2/1995 |
| DE | 29718741 | 4/1998 |
| EP | 0115707 | 8/1984 |
| EP | 0823599 | 2/1998 |
| GB | 2173123 | 10/1986 |

* cited by examiner

Primary Examiner—Derek Boles
(74) Attorney, Agent, or Firm—Collard & Roe, P.C.

(57) ABSTRACT

The invention pertains to a heating apparatus (1), in particular, an auxiliary heater and/or a parking heater for a motor vehicle, with a one-piece or one-part housing (2) that contains a combustion chamber shaft (3), in which a heat transfer casing (8) is arranged, wherein the inner side (9) of said heat transfer casing encloses a combustion chamber (5) and is subjected to hot exhaust gases during the operation of the heating apparatus (1), wherein the outer side (11) of the heat transfer casing forms the inner envelope of a cooling fluid space (10), through which a cooling fluid flows during the operation of the heating apparatus (1), wherein the outer envelope of said cooling fluid space is formed by the inner side of the combustion chamber shaft (3), and wherein the housing (2) also contains a catalyst shaft (4), in which at least one catalytic element (15) is arranged through which hot exhaust gases flow during the operation of the heating apparatus (1).

11 Claims, 2 Drawing Sheets

HEATING APPARATUS AND HOUSING FOR A HEATING APPARATUS

Figure 1:
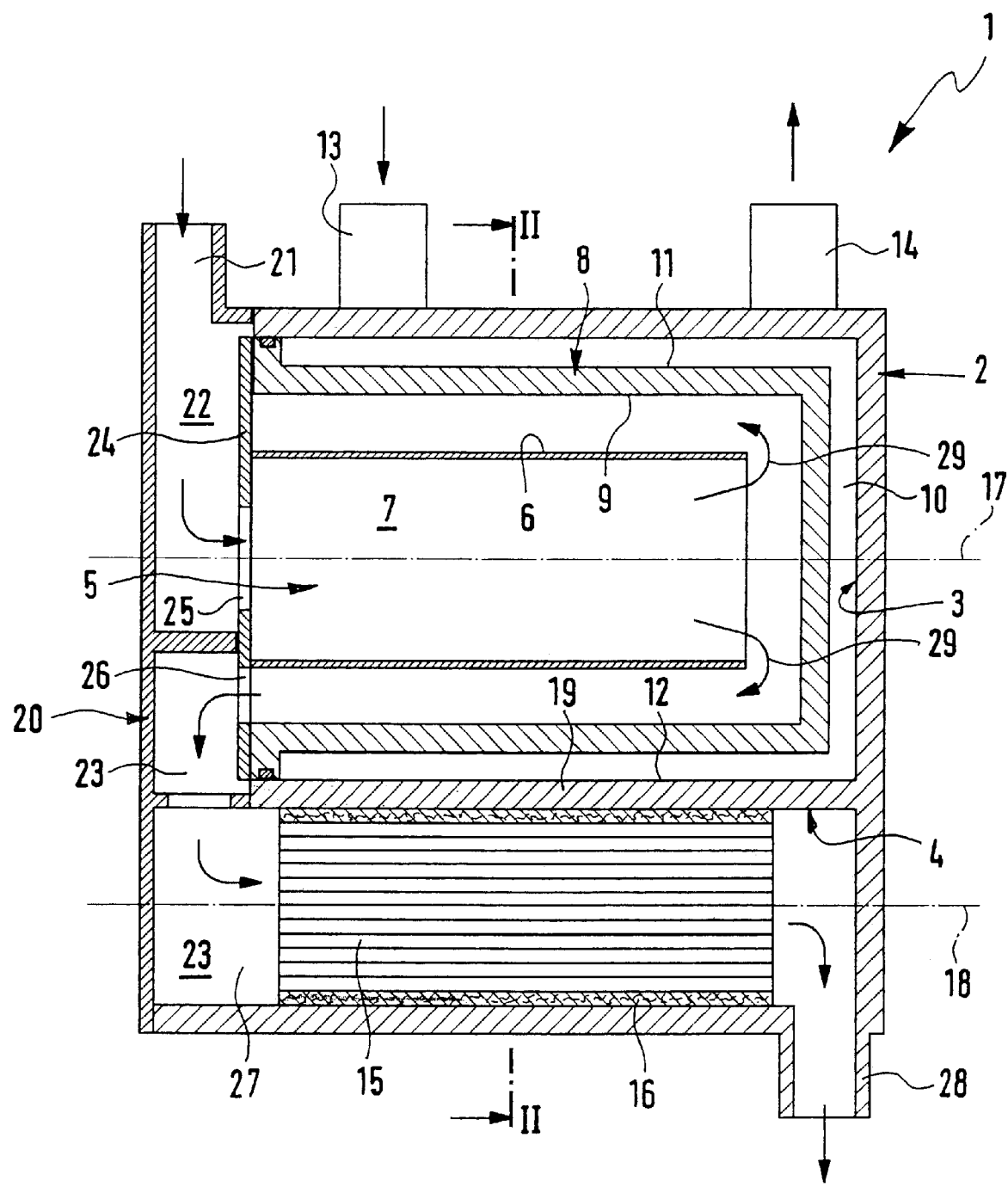

The present invention pertains to a heating apparatus and a housing for a heating apparatus, in particular, a parking heater and/or auxiliary heater for a motor vehicle.

Heating apparatuses that are used as auxiliary heaters and/or parking heaters operate independently of the internal combustion engine of a motor vehicle equipped with the heating apparatus, wherein a fuel, in particular, the fuel of the motor vehicle, is burned in order to generate heat. The exhaust gases created during the combustion are discharged from the heating apparatus, wherein an exhaust gas branch is usually connected to the heater for transporting the exhaust gases away from the heating apparatus and emitting said exhaust gases into the surroundings.

DE 43 27 139 A1 discloses a heating apparatus for motor vehicles which contains catalytically active coated sections arranged in the housing of the heating apparatus, wherein the hot exhaust gases created during the combustion of a liquid fuel are conveyed over these catalytically active sections. This measure makes it possible to reduce the emission of harmful substances by the heating apparatus. The catalytically active sections are arranged downstream of a combustion chamber in the region of a flame tube, as well as in the region of the heat exchanger of the heating apparatus. This means that the catalytically active sections are integrated into the heating apparatus without having to perform any constructive changes on the heater. In this case, the catalytically active sections are subjected to relatively high thermal loads. The volume available for the catalyst is very limited if the volume required for the oxidation (combustion) should not be reduced.

The present invention is based on the objective of disclosing an improved embodiment of a heating apparatus of the initially described type which, in particular, has a simple design.

This objective is attained with the object of the independent claims. Advantageous embodiments form the objects of the dependent claims.

The invention, in principle, proposes to realize a one-part or one-piece housing of the heating apparatus in such a way that a catalyst shaft is integrated therein, wherein the catalyst shaft serves for accommodating at least one catalytic element, through which the exhaust gases created during the operation of the heating apparatus flow. Consequently, the housing contains a catalyst shaft and a combustion chamber shaft, in which the combustion chamber of the heating apparatus is arranged or accommodated. According to the invention, the catalyst housing and a combustion chamber housing are combined into one structural unit. Such a unit can, for example, be inexpensively manufactured in one piece, in particular, from aluminum or an aluminum alloy, by means of a die casting method. The manufacture of the housing according to the invention is, in particular, less expensive than the manufacture and assembly of separate housings for the catalyst and the combustion chamber. Particularly suitable operating conditions for the catalyst accommodated in the catalyst shaft, e.g., a monolith, can be realized due to the integration of the catalyst shaft into the housing. Since the catalyst is arranged in the vicinity of the combustion chamber, the catalyst is heated relatively fast when the heating apparatus is started such that the catalyst very rapidly reaches the required operating temperature. Due to the integration of the catalyst shaft into the housing, the shape of the catalytic element or the catalyst can be adapted to the shape of the housing, in particular, with respect to a very compact structural shape of the entire unit. In addition, the dimensions of the catalyst shaft can be easily chosen such that the catalytic element accommodated therein has a sufficient volumetric and/or surface potential. This makes it possible to prevent, in particular, intense pressure drops during the flow of the exhaust gases through the catalytic element. In addition, the assembly of the heating apparatus is very simple because the respective catalytic element can, if applicable, be installed into the heating apparatus with only slight additional expenditures, for example, with a support mat or the like. The installation of an additional holding arrangement for a separate catalyst housing is eliminated. Another important advantage of the design according to the invention can be seen in the fact that a sound insulation function is already realized in the housing due to the integration of the catalyst shaft into the housing, namely because the catalytic element acts as a sound absorber while the exhaust gas flows through the catalyst shaft.

According to one additional development, the catalyst shaft is arranged downstream of an exhaust gas outlet of the combustion chamber, i.e., the catalytic element accommodated in the catalyst shaft is arranged behind the combustion chamber and, in particular, a heat exchanger of the heating apparatus. Due to this measure, the exhaust gas temperatures at the inlet of the catalyst are comparatively low such that a longer service life of the catalytic element can be achieved.

Other important characteristics and advantages of the invention are disclosed in the dependent claims, the figures and the following description that refers to the figures.

It goes without saying that the previously discussed characteristics, as well as the characteristics discussed below, cannot only be utilized in the respectively described combination, but also individually or in other combinations without deviating from the scope of the present invention.

One preferred embodiment of the invention is illustrated in the figures and described in greater detail below, wherein the same reference symbols refer to identical or functionally identical or similar components.

Figure 2:
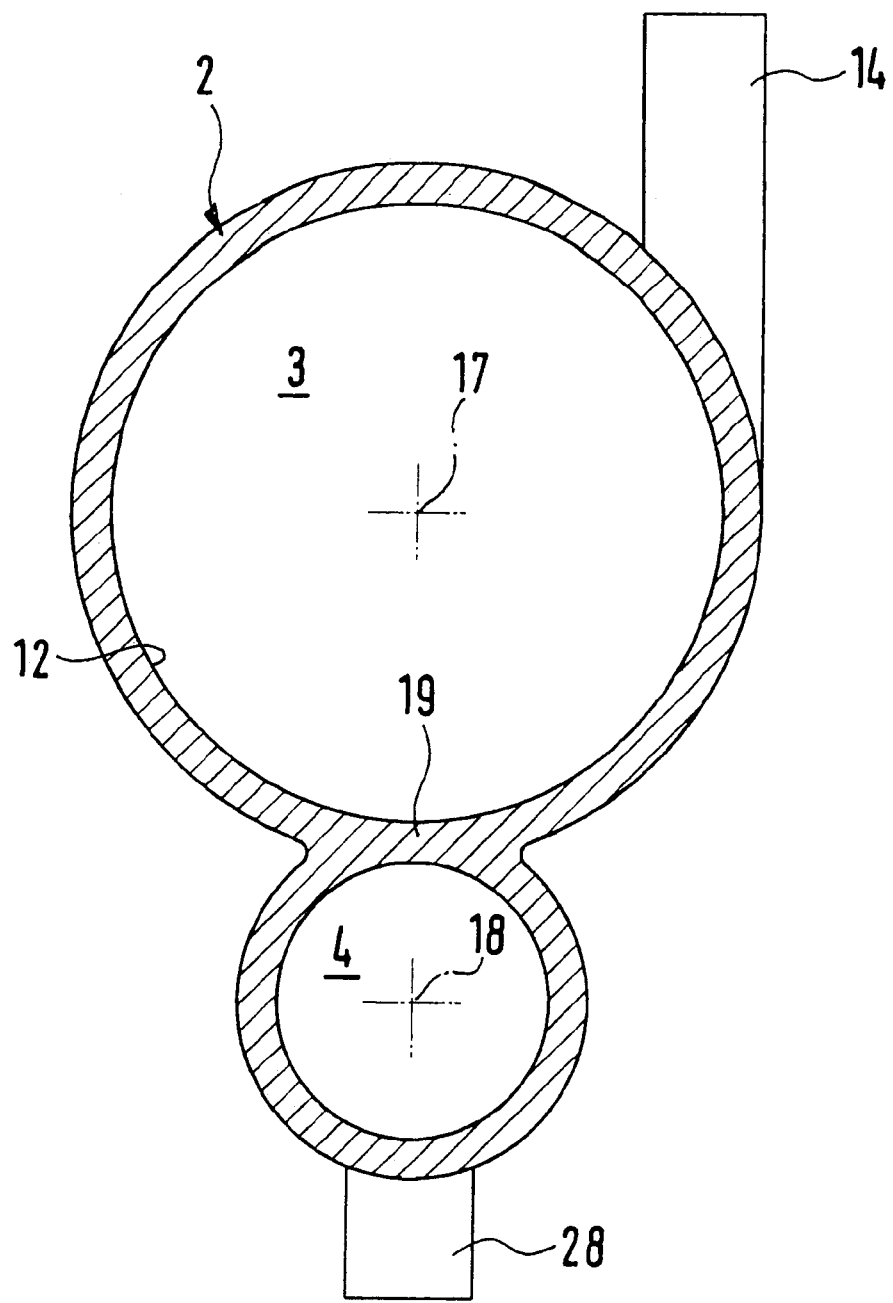

The respective figures schematically show:

FIG. 1 a highly schematic longitudinal section through a heating apparatus according to the invention, and FIG. 2 a cross section through the housing of the heating apparatus along the line of section II in FIG. 1.

According to FIG. 1, a heating apparatus 1 comprises a housing 2 that contains a combustion chamber shaft 3 and a catalyst shaft 4. The housing 2 is realized in one part or one piece and, for example, manufactured in the form of an integral component by means of a die casting method. The heating apparatus 1 may, for example, be realized in the form of a parking heater and/or an auxiliary heater for a motor vehicle, wherein the heating apparatus 1 operates independently of the internal combustion engine of the motor vehicle.

The combustion chamber shaft 3 accommodates a combustion chamber 5 that essentially consists of a combustion space 7 that is surrounded by a flame tube 6. The combustion chamber 5 its enclosed in a heat transfer casing 8, wherein the dimensions are chosen such that a flow path 29 for the hot exhaust gases created by the combustion is formed between the flame tube 6 and the inner side 9 of the heat transfer casing 8. This means that hot exhaust gases act upon the inner side 9 of the heat transfer casing 8 during the operation of the heating apparatus 1. In addition, the heat transfer casing 8 is subjected to the thermal radiation emitted by the flame tube 6 on its inner side 9 during the operation of the heating apparatus 1. The heat transfer casing 8 has such dimensions and is inserted into the combustion chamber shaft 3 in such a way that a cooling fluid space 10 is formed between the combustion chamber shaft 3 and the heat transfer casing 8. The outer side 11 of the heat transfer casing 8 forms the inner envelope of this cooling fluid space 10 while the inner side 12 of the combustion chamber shaft 3 forms the outer envelope of the cooling fluid space 10. In a conventional heating apparatus 1, water or a water/glycol mixture is used as the cooling fluid. A cooling fluid inlet 13 and a cooling fluid outlet 14 preferably are integrally formed onto the housing 2, wherein the cooling fluid inlet and the cooling fluid outlet respectively communicate with the cooling fluid space 10, i.e., with the combustion chamber shaft 3. During the operation of the heating apparatus 1, the cooling fluid flows through the cooling fluid space 10 in order to transport away the heat transferred from the combustion chamber 5 to the heat transfer casing 8. This means that a heat exchanger is realized due to the insertion of the heat transfer casing 8 into the combustion chamber shaft 3, wherein said heat exchanger makes it possible to transfer the heat generated by the combustion chamber 5 to a cooling fluid.

A catalytic element 15 that is realized in the form of a one-piece monolith in the embodiment shown is accommodated in the catalyst shaft 4. The catalytic monolith 15 consists, for example, of a ceramic material that is catalytically coated. The catalytic element 15 is enclosed in a support material 16 so as to fix the sensitive monolith 15 in the catalyst shaft 4 in a shock-absorbing and tension-free fashion. The support material 16 preferably consists of a swelling mat.

In the preferred embodiment shown, the combustion chamber shaft 3 and the catalyst shaft 4 are aligned parallel to one another, i.e., a longitudinal axis 17 of the combustion chamber shaft 3 extends parallel to a longitudinal axis 18 of the catalyst shaft 4. This makes it possible to realize a relatively compact housing 2. For this purpose, the combustion chamber shaft 3 and the catalyst shaft 4 are also separated from one another by a common wall section 19. In addition to achieving a compact structural shape, this common wall section 19 also makes it possible to rapidly heat the catalyst 15 when the heating apparatus 1 is started.

According to FIG. 1, both shafts 3 and 4 are respectively open on the same side of the housing, namely the left side, wherein the housing 2 is closed on this side with a housing cover 20. This housing cover 20 may also be realized in one part or one piece, in particular, in the form of a die cast part. The housing cover 20 has a fresh gas inlet 21 and contains a fresh gas chamber 22 and an exhaust gas chamber 23. However, the fresh gas chamber 22 and the exhaust gas chamber 23 are only completed once the housing cover 20 is attached onto the housing 2. In addition, a combustion chamber end plate 24 is provided, wherein the flame tube 6 may be arranged on this combustion chamber end plate that, in turn, is arranged on the heat transfer casing 8. In the assembled state of the heating apparatus 1, the fresh gas chamber 22 produces a communicating connection between the fresh gas inlet 21 and an inlet 25 of the combustion chamber 5. The exhaust gas chamber 23 produces a communicating connection between an outlet 26 of the combustion chamber 5 and an inlet 27 of the catalyst shaft 4. In addition, an exhaust gas outlet 28, e.g., in the form of a connection piece that is integrally formed onto the housing 2, is provided downstream of the catalytic element 15.

During the operation of the heating apparatus 1, fresh air that is introduced into the fresh gas chamber 22 is supplied to the heating apparatus 1 via the fresh gas inlet 21. The fresh gas is conveyed from the fresh gas chamber 22 into the combustion space 7 of the combustion chamber 5 through the combustion chamber inlet 25. The hot exhaust gases created during the combustion emerge, in particular, on the end face of the flame tube 6 and flow around the flame tube 6. This means that the inner side 9 of the heat transfer casing 8 is subjected to the hot exhaust gases and radiated heat. The outer side 11 of the heat transfer casing 8 is cooled due to the fact that the cooling fluid in the cooling fluid chamber 10 absorbs and transports away the heat. In this respect, the heat transfer casing 8 causes a transfer of the thermal energy from the hot combustion gases to the cooling fluid. This cooling fluid can, for example, be used for heating the interior of a motor vehicle and/or an internal combustion engine of the vehicle equipped with the heating apparatus 1.

The more or less cooled exhaust gases follow the flow path 29 and are transferred from the combustion chamber 5 into the exhaust gas chamber 23 through the combustion chamber outlet 26. In the exhaust gas chamber, the exhaust gases are deflected toward the catalyst inlet 27. A conversion of harmful substances takes place in the catalytic element 15 that, in particular, may be realized in the form of an oxidation catalyst so as to improve the emission of harmful substances contained in the exhaust gases. The catalytically treated exhaust gases emerge from the heating apparatus 1 through the exhaust gas outlet 28 and are transported, for example, into a not-shown exhaust gas line.

Since the catalyst shaft 4 is completely separated from the combustion chamber shaft 3, the catalyst shaft 4 and the catalytic element 15 accommodated therein are arranged downstream of the exhaust gas outlet 26 of the combustion chamber 5. This means that the exhaust gases are only transported to the catalyst 15 when the main function of the heating apparatus 1, namely the heat transfer from the exhaust gases to the cooling fluid, is essentially completed. Since comparatively cool exhaust gases are transported to the catalytic element 15, the service life of the catalytic element 15 is relatively long. The common wall section 19 makes it possible to rapidly reach the operating temperature of the catalytic element 15 when the heating apparatus 1 is started because the catalytic element 15 can be heated via the wall section 19. Additional heat that may be generated in the catalyst 15 can also be transferred to the cooling fluid via the wall section 19 during the operation of the heating apparatus such that the degree of efficiency of the heating apparatus 1 is additionally improved.

What is claimed is:

1. A one-piece or one-part housing for a heating apparatus (1), in particular, an auxiliary heater and/or a parking heater for a motor vehicle, with a combustion chamber shaft (3) that serves for accommodating a heat transfer casing (8), the inner side (9) of which encloses a combustion chamber (5) and is subjected to hot exhaust gases during the operation of the heating apparatus (1), wherein the outer side (11) of the heat transfer casing forms the inner envelope of a cooling fluid space (10), through which a cooling fluid flows during the operation of the heating apparatus (1), and wherein the outer envelope of the cooling fluid space is formed by the inner side (12) of the combustion chamber shaft (3), and with a catalyst shaft (4) for accommodating at least one catalytic element (15), through which exhaust gases flow during the operation of the heating apparatus (1) and characterized by the fact that the catalyst shaft (4) being offset and parallel with respect to combustion shaft (3) is arranged down stream of an of an exhaust gas outlet (26) of the combustion chamber (5).

2. The housing according to claim 1, characterized by the fact chat an exhaust gas outlet (28) that communicates with the catalyst shaft (4) is integrally formed onto the housing (2).

3. The housing according to claim 1, characterized by the fact that a cooling fluid inlet (13) or a cooling fluid outlet (14) chat communicate(s) with the combustion chamber shaft (3) is/are integrally formed onto the housing (2).

4. The housing according to claim 1, characterized by the fact that the combustion chamber shaft (3) and the catalyst shaft (4) have a common wall section (19).

5. The housing according to claim 1, characterized by the fact that a longitudinal direction (17) of the combustion chamber shaft (3) and a longitudinal direction (18) of the catalyst shaft (4) extend parallel to one another.

6. The housing according to claim 1, characterized by the fact that the combustion chamber shaft (3) and the catalyst shaft (4) are open on the same side of the housing.

7. A heating apparatus, in particular, an auxiliary heater and/or a parking heater for a motor vehicle, with a one-piece or one-part housing (2) that contains a combustion chamber shaft (3), in which a heat transfer casing (8) is arranged, wherein the inner side (9) of said heat transfer casing encloses a combustion chamber (5) and is subjected to hot exhaust gases during the operation of the heating apparatus (1), wherein the outer side (11) of the heat transfer casing forms the inner envelope of a cooling fluid space (10), through which a cooling fluid flows during the operation of the heating apparatus (1), wherein the outer envelope of said cooling fluid space is formed by the inner side (12) of the combustion chamber shaft (3), and wherein the housing (2) also contains a catalyst shaft (4), in which at least one catalytic element (15) is arranged through which hot exhaust gases flow during the operation of the heating apparatus (1) and characterized by the fact that the catalyst shaft (4) being offset and parallel with respect to combustion shaft (3) is arranged downstream of an exhaust gas outlet (26) of the combustion chamber (5).

8. The heating apparatus according to claim 7, characterized by the fact that the housing (2) is closed with a housing cover (20), wherein the housing cover (20) contains a fresh gas inlet (21), through which fresh gas is introduced into the heating apparatus (1) during the operation of the heating apparatus (1), wherein the housing cover (20) contains a fresh gas chamber (22) that produces a communicating connection between the fresh gas inlet (21) and an inlet (25) of the combustion chamber (5), and wherein the housing cover (20) contains an exhaust gas chamber (23) that produces a communicating connection between an outlet (26) of the combustion chamber (5) and an inlet (27) of the catalyst shaft (4).

9. The heating apparatus according to claim 8, characterized by the fact that the housing cover (20) consists of one part or one piece.

10. The heating apparatus according to claim 7, characterized by the fact that the catalytic element (15) is realized in the form of a monolith.

11. The heating apparatus characterized by the characteristics disclosed in the characterizing portion of claim 2.

* * * * *